(12) United States Patent
Hao et al.

(10) Patent No.: US 9,837,653 B2
(45) Date of Patent: Dec. 5, 2017

(54) TWO COMPARTMENT LITHIUM SULFUR CELL AND ASSEMBLY METHOD

(71) Applicant: Nissan North America, Inc., Franklin, TN (US)

(72) Inventors: Xiaoguang Hao, Farmington Hills, MI (US); Kenzo Oshihara, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 268 days.

(21) Appl. No.: 14/629,787

(22) Filed: Feb. 24, 2015

(65) Prior Publication Data

US 2016/0248067 A1    Aug. 25, 2016

(51) Int. Cl.
| | |
|---|---|
| *H01M 2/18* | (2006.01) |
| *H01M 10/052* | (2010.01) |
| *H01M 10/058* | (2010.01) |
| *H01M 4/38* | (2006.01) |
| *H01M 2/16* | (2006.01) |
| *H01M 10/0585* | (2010.01) |

(52) U.S. Cl.
CPC .......... *H01M 2/18* (2013.01); *H01M 2/1686* (2013.01); *H01M 10/052* (2013.01); *H01M 10/0585* (2013.01); *H01M 4/38* (2013.01); *H01M 4/382* (2013.01)

(58) Field of Classification Search
None
See application file for complete search history.

(56) References Cited

U.S. PATENT DOCUMENTS

| | | | |
|---|---|---|---|
| 2002/0182508 A1 | 12/2002 | Nimon et al. | |
| 2003/0003365 A1* | 1/2003 | Sagawa | H01M 2/16 429/246 |
| 2007/0037058 A1* | 2/2007 | Visco | H01B 1/122 429/246 |
| 2007/0051620 A1* | 3/2007 | Visco | H01M 4/02 204/280 |
| 2011/0177398 A1 | 7/2011 | Affinito et al. | |
| 2011/0223464 A1* | 9/2011 | Viavattine | H01M 2/16 429/144 |
| 2011/0287305 A1 | 11/2011 | Scordilis-Kelley et al. | |
| 2014/0050973 A1* | 2/2014 | Manthiram | H01M 2/1646 429/188 |

\* cited by examiner

*Primary Examiner* — Daniel Gatewood
(74) *Attorney, Agent, or Firm* — Young Basile Hanlon & MacFarlane, P.C.

(57) ABSTRACT

Electrochemical cells for lithium-sulfur batteries include a cathode comprising a sulfur containing material, an anode comprising lithium, a separator between the anode and cathode and an interlayer extending from a perimeter of the separator in a direction perpendicular to a stacking direction. The interlayer is configured to prevent polysulfide migration from the cathode to the anode.

20 Claims, 4 Drawing Sheets

TWO COMPARTMENT LITHIUM SULFUR CELL AND ASSEMBLY METHOD

TECHNICAL FIELD

This disclosure relates to a lithium sulfur battery comprised of a two compartment cell with polysulfide migration prevention.

BACKGROUND

The lithium-sulfur battery (Li—S battery) is a rechargeable battery, notable for its high energy density. Li—S batteries may be a successful alternative to lithium-ion cells because of their higher energy density and reduced cost from the use of sulfur. However, Li—S batteries do present some challenges that must be addressed before the advantages of Li—S batteries can be fully appreciated. For example, during discharge, polysulfides form at the cathode of the batteries. Certain higher order, soluble polysulfides may migrate to the anode and react with the anode, causing a reduction in battery performance. These polysulfides diffuse through the electrolyte to the anode where they are reduced to lower polysulfides that, in turn, diffuse back through the electrolyte to the cathode to be oxidized to higher polysulfides. This causes a continuous shuttle effect, resulting in low battery efficiency.

SUMMARY

Electrochemical cells for lithium-sulfur batteries are disclosed. One embodiment of an electrochemical cell for a lithium-sulfur battery comprises a cathode comprising a sulfur containing material, an anode comprising lithium, a separator between the anode and cathode and an interlayer extending from a perimeter of the separator in a direction perpendicular to a stacking direction. The interlayer is configured to prevent polysulfide migration from the cathode to the anode.

The electrochemical cell can further comprise a cathode current collector on the cathode opposite the separator, an anode current collector on the anode opposite the separator, a first cell wall on one of the cathode current collector and the anode current collector and a second cell wall on another of the cathode current collector and the anode current collector, wherein the interlayer has a size similar to the first cell wall and the second cell wall and perimeters of the interlayer, the first cell wall and the second cell wall are sealed to form the electrochemical cell.

Methods of assembling the electrochemical cell are also disclosed. One such method comprises aligning a separator with an aperture in an interlayer such that the interlayer extends from a perimeter of the separator, affixing the separator and the interlayer to each other, layering a cathode comprising a sulfur containing material on one side of the separator and layering an anode comprising lithium on another side of the separator. The interlayer is configured to prevent polysulfide migration from the cathode to the anode.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Chemical processes in the Li—S cell include lithium dissolution from the anode surface (and incorporation into alkali metal polysulfide salts) during discharge, and reverse lithium plating to the anode while charging. The lithium, during discharge, is transported across the electrolyte from the anode to the cathode and reacts with sulfur to undergo the following reaction, with a reverse reaction occurring when the cell is charged:

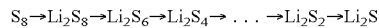

Across a separator, sulfur polymers form at the cathode as the cell charges:

One of the primary shortfalls of most lithium-sulfur cells is unwanted reactions forming polysulfides. The formation of the polysulfides results in irreversible loss of active sulfur and capacity degradation. The electrochemical cells and methods herein address this polysulfide migration from the cathode to the anode, confining the polysulfides on the cathode side of the electrochemical cell.

Figure 1:
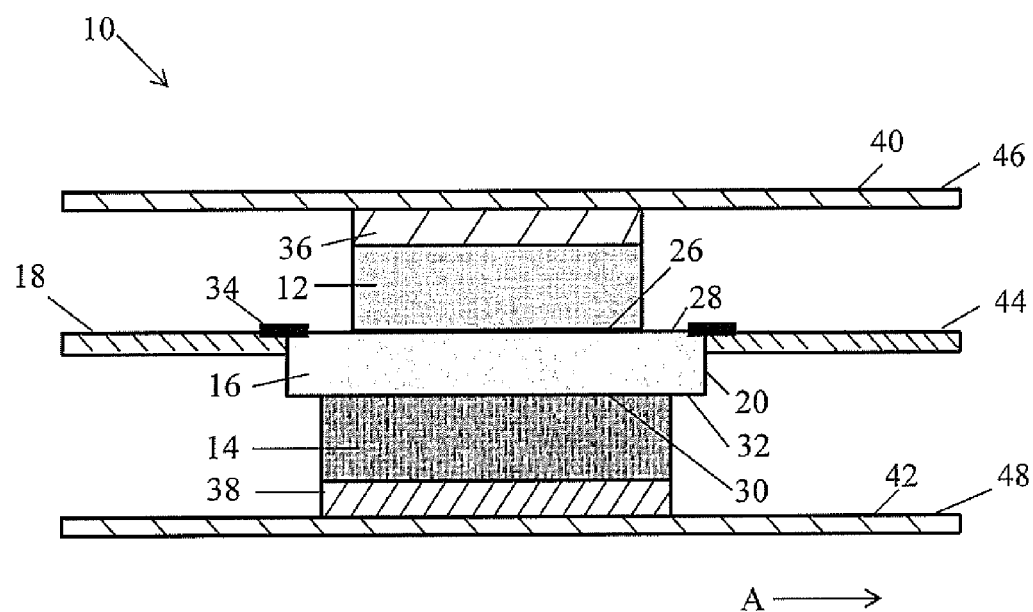
FIG. 1 is a cross-sectional view of an electrochemical cell for a lithium-sulfur battery as disclosed herein.

FIG. 1 is a cross-sectional view of an electrochemical cell 10 as disclosed herein. The electrochemical cell 10 for a lithium-sulfur battery includes a cathode 12 comprising sulfur containing material and an anode 14 comprising lithium. A separator 16 is positioned between the anode 14 and cathode 12. An interlayer 18 extends from a perimeter 20 of the separator 16 in a direction, shown by arrow A, that is perpendicular to a stacking direction. The interlayer 18 is configured to prevent polysulfide migration from the cathode 12 to the anode 14.

Sulfur-containing materials suitable for use in the cathode 12 comprise element sulfur in any form, wherein the electrochemical activity involves the breaking or forming of sulfur-sulfur covalent bonds. Suitable electroactive sulfur-containing materials include, but are not limited to, elemental sulfur and organic materials comprising sulfur atoms and carbon atoms, which may or may not be polymeric.

The material of the separator 16 must not block the transport of lithium ions while preventing the physical contact of the anode 14 and the cathode 12, e.g. short-circuiting. In a liquid cell, the separator 16 could be a porous glass or polymer mesh that allows ion transport via the liquid electrolyte through the pores, but keeps the electrodes from contacting and shorting. Alternatively, the separator 16 can be a solid state electrolyte, which satisfies both the ion transportation and the physical separation requirements without the need for a dedicated separator and liquid electrolyte.

The interlayer 18 is configured to prevent polysulfide migration from the cathode 12 to the anode 14, improving the cycling ability of the battery. The interlayer 18 is designed to minimize any increase in cell volume and to avoid creating any negative effects on the cathode 12 and anode 14. The interlayer 18 material can be, as non-limiting examples, polyethylene, polypropylene or a polymer laminated aluminum foil. The interlayer 18 can have a thickness in a range of 30 μm to 100 μm.

The interlayer 18 is sized and positioned to separate the cathode 12 and the anode 14 without contacting either the cathode 12 or the anode 14. The interlayer 18 is also sized and positioned to minimize any effect on the surface area of the separator 16. The interlayer 18 and the separator 16 are affixed to each other with adhesive.

Figure 2:
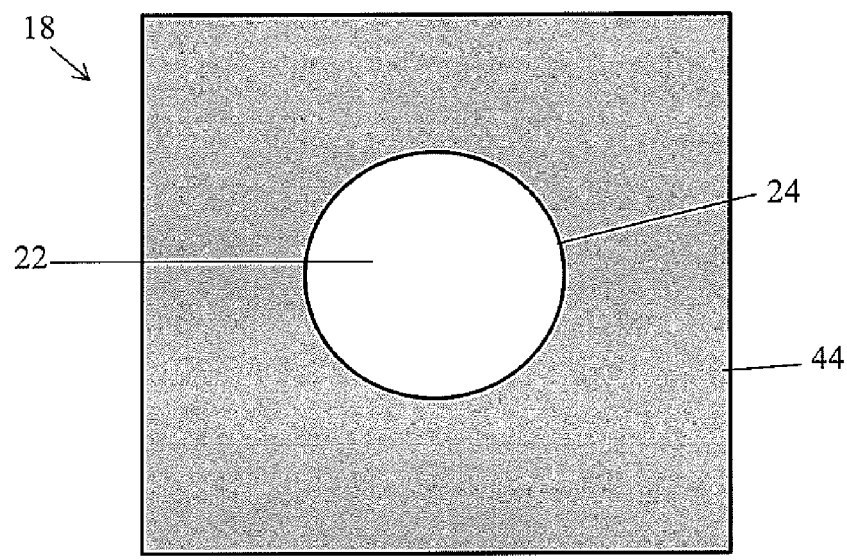
FIG. 2 is a plan view of an interlayer of the electrochemical cell for a lithium-sulfur battery as disclosed herein.

In one embodiment, the interlayer 18, shown in FIG. 2, is a sheet having an aperture 22 sized to expose the separator 16 when the interlayer 18 and the separator 16 are layered in the stacking direction. The perimeter 20 of the separator 16 and the defining edge 24 of the aperture 22 can be sized so that the separator 16 just fits inside the aperture 22. The perimeter 20 of the separator 16 and the defining edge 24 of the aperture 22 can be sized so that the perimeter 20 of the separator 16 and the defining edge 24 of the aperture 22 overlap. As illustrated herein, the cathode 12, anode 14, separator 16, aperture 22 and other layers are round. However, the drawings are not meant to be limiting. The cathode 12, anode 14, separator 16, aperture 22 and other layers can be any shape or size as desired or required.

The cathode 12 has a separator-facing surface 26 facing a cathode-facing surface 28 of the separator 16, while the anode 14 has a separator-facing surface 30 facing an anode-facing surface 32 of the separator 16. In one embodiment, the aperture 22 of the interlayer 18 has an area larger than the area of the separator-facing surface 26 of the cathode 12 and larger than the area of the separator-facing surface 30 of the anode 14.

Figure 3:
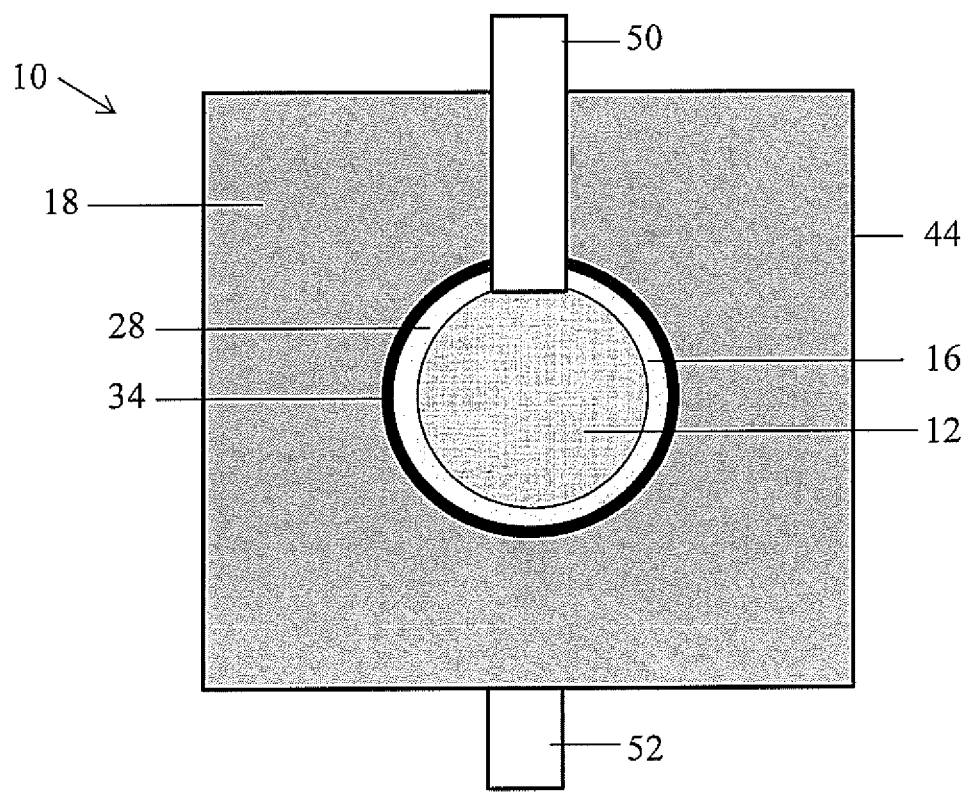
FIG. 3 is a plan view of the electrochemical cell of FIG. 1 from the cathode side with the cell wall and cathode current collector removed.

The cathode-facing surface 28 of the separator 16 can have a first surface area and the separator-facing surface 26 of the cathode 12 can have a second surface area, the first surface area being larger than the second surface area. The separator 16 can be fixed to the interlayer 18 with poly (oxydiphenylene-pyromellitimide) tape 34 or other similar adhesive material on the cathode-facing surface 28 of the separator 16, as illustrated in FIGS. 1 and 3. The adhesive tape can have a thickness ranging from about 10 μm to about 100 μm. The width of the adhered area can be variable, but typically be from about 1 mm to 2 mm wide.

Figure 4:
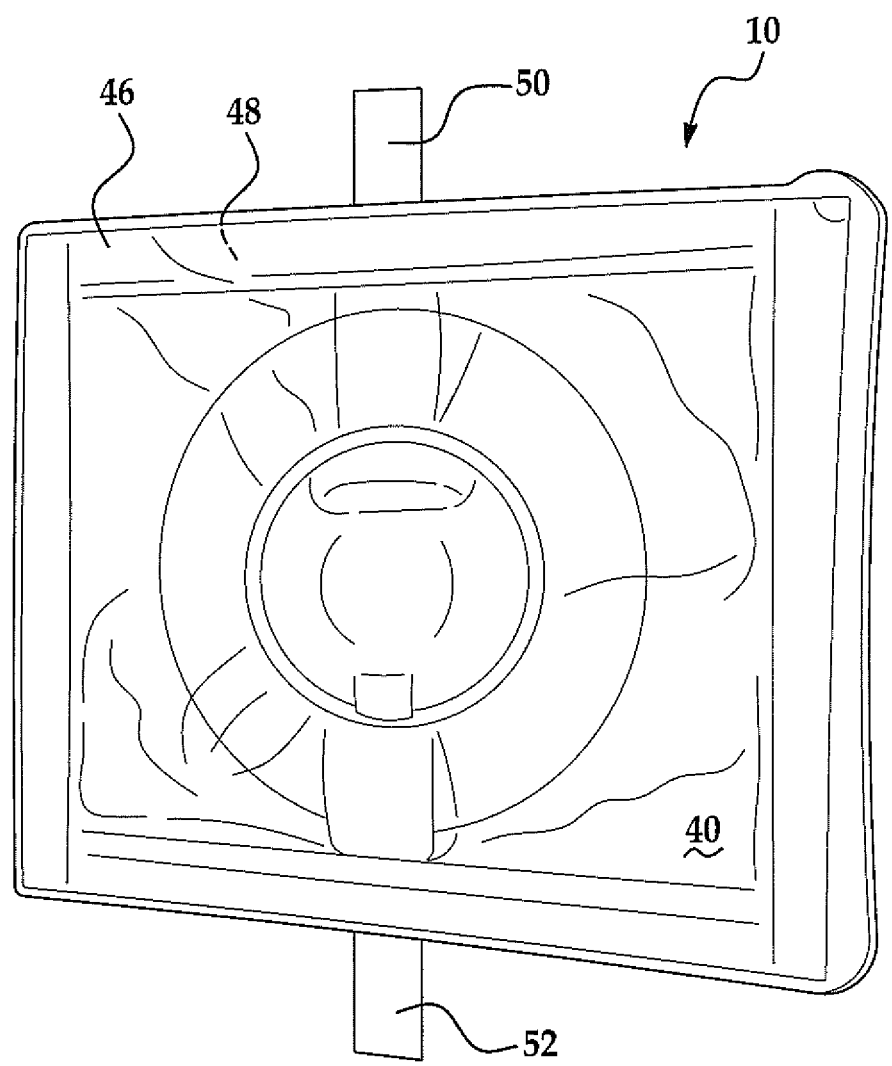
FIG. 4 is a plan view of the electrochemical cell of FIG. 1.

The electrochemical cells disclosed herein may be referred to as pouch, coin or compartment cells. The electrochemical cells disclosed herein form two-compartment cells, as the interlayer 18 effectively divides the cell into a cathode compartment and an anode compartment. The electrochemical cells 10 further include a cathode current collector 36 on the cathode 12 opposite the separator 16 and an anode current collector 38 on the anode 14 opposite the separator 16. A first cell wall 40 is positioned on the cathode current collector 36 and a second cell wall 42 is positioned on the anode current collector 38. The interlayer 18 has a size similar to the first cell wall 40 and the second cell wall 42. Although shown in the shape of a square, the shape is not limiting and any other shape is contemplated. A perimeter 44 of the interlayer 18, a perimeter 46 of the first cell wall 40 and a perimeter 48 of the second cell wall 42 are sealed to form the electrochemical cell 10 shown in FIG. 4. FIGS. 3 and 4 also illustrate the cathode collector tab 50 and the anode collector tab 52. The tab 50, 52 locations are provided by example and are not meant to be limiting.

The cell walls 40, 42 can be polymer laminated aluminum foil. The polymer material can be, as non-limiting examples, polyethylene, polypropylene, polyimide or polyurethane. The thickness of the polymer and foil can vary from about 10 μm to about 100 μm. The sealant can be any sealant known to those skilled in the art.

Figure 5:
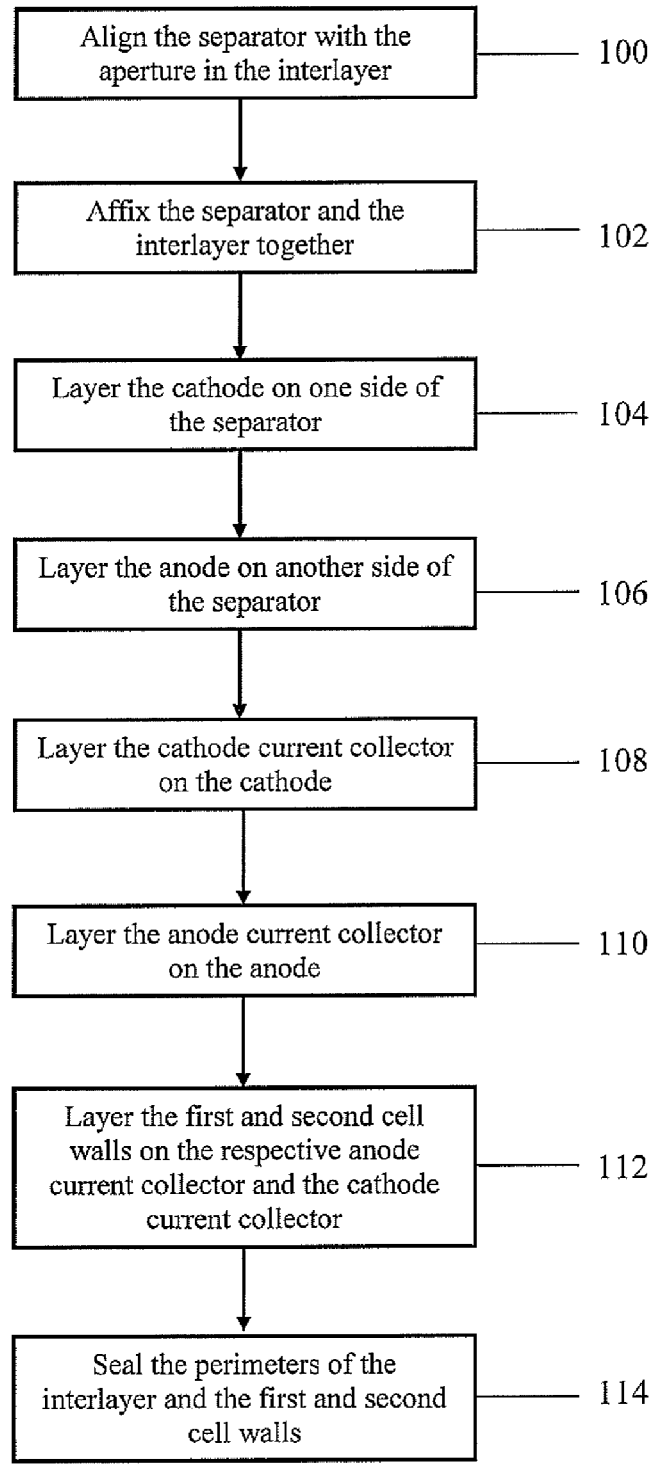
FIG. 5 is a flow diagram of a method of assembling an electrochemical cell for a lithium-sulfur battery as disclosed herein.

Also disclosed herein are methods of assembling the electrochemical cell 10 disclosed herein. With reference to FIG. 5, the separator 16 is aligned with the aperture 22 in the interlayer 18 such that the interlayer 18 extends from the perimeter 20 of the separator 16 in step 100. The separator 16 and the interlayer 18 are then affixed to each other in step 102. The cathode 12 comprising the sulfur containing material is layered on one side of the separator 16 in step 104 and the anode 14 comprising lithium is layered on another side of the separator 16 in step 106.

The cathode current collector 36 is layered on the cathode 12 opposite the separator 16 in step 108 and the anode current collector 38 is layered on the anode 14 opposite the separator 16 in step 110. The first cell wall 40 is layered on one of the cathode current collector 36 and the anode current collector 38 and the second cell wall 42 is layered on another of the cathode current collector 36 and the anode current collector 38 in step 112. The perimeters 44, 46, 48 of the interlayer 18, the first cell wall 40 and the second cell wall 42 are sealed to form the electrochemical cell 10 in step 114.

As described herein, the processes include a series of steps. Unless otherwise indicated, the steps described may be processed in different orders, including in parallel. Moreover, steps other than those described may be included in certain implementations, or described steps may be omitted or combined, and not depart from the teachings herein.

All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present device and methods and are disclosed herein just as if each and every such sub-combination was individually and explicitly disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrochemical cell comprising:
a cathode comprising a sulfur containing material;
an anode comprising lithium;
a separator between the anode and cathode; and
an interlayer having an inner perimeter defining a central aperture, the inner perimeter in contact with a perimeter edge of the separator, the interlayer extending outward in a direction perpendicular to a stacking direction, the interlayer configured to prevent polysulfide migration from the cathode to the anode.

2. The electrochemical cell of claim 1, wherein the separator is fixed to the interlayer with adhesive.

3. The electrochemical cell of claim 1, wherein the interlayer is one of polyethylene and polypropylene.

4. The electrochemical cell of claim 1, wherein the interlayer is a polymer laminated aluminum foil.

5. The electrochemical cell of claim 1, wherein the aperture is sized to expose the entire separator.

6. The electrochemical cell of claim 5, wherein the aperture has an area larger than a separator-facing surface area of the cathode and larger than a separator-facing surface area of the anode.

7. The electrochemical cell of claim 1, wherein the separator has a cathode-facing surface with a first surface area and the cathode has a separator-facing surface with a second surface area, the first surface area being larger than the second surface area, wherein the separator is fixed to the interlayer with poly (oxydiphenylene-pyromellitimide) tape on the cathode-facing surface of the separator.

8. The electrochemical cell of claim 1, wherein the interlayer has a thickness in a range of 30 µm to 100 µm.

9. The electrochemical cell of claim 1, further comprising:
a cathode current collector on the cathode opposite the separator;
an anode current collector on the anode opposite the separator;
a first cell wall on one of the cathode current collector and the anode current collector; and
a second cell wall on another of the cathode current collector and the anode current collector, the first cell wall and the second cell wall each having a surface area larger than each of the cathode current collector and the anode current collector, wherein the interlayer has an outer perimeter similar in size to an outer perimeter of each of the first cell wall and the second cell wall and outer perimeters of the interlayer, the first cell wall and the second cell wall are sealed together to form the electrochemical cell.

10. The electrochemical cell of claim 9, wherein the first cell wall and the second cell wall are a polymer laminated aluminum foil.

11. The electrochemical cell of claim 1, wherein the separator is a solid state electrolyte.

12. A method of assembling an electrochemical cell comprising:
aligning a separator into an aperture in an interlayer such that the interlayer extends from a perimeter of the separator without covering any of a surface of the separator;
affixing the separator and the interlayer to each other;
layering a cathode comprising a sulfur containing material on one side of the separator; and
layering an anode comprising lithium on another side of the separator, wherein the interlayer is configured to prevent polysulfide migration from the cathode to the anode.

13. The method of claim 12, wherein the interlayer is one of polyethylene and polypropylene.

14. The method of claim 12, wherein the interlayer is a polymer laminated aluminum foil.

15. The method of claim 12, wherein the aperture has an area larger than a separator-facing surface area of the cathode and larger than a separator-facing surface area of the anode.

16. The method of claim 15, wherein the separator has a cathode-facing surface that is larger than the separator-facing surface area of the cathode, and wherein affixing the separator and the interlayer comprises spanning an interface between the separator and the interlayer on the cathode-facing surface of the separator with poly (oxydiphenylene-pyromellitimide) tape.

17. The method of claim 12, wherein the interlayer has a thickness in a range of 30 µm to 100 µm.

18. The method of claim 12, further comprising:
layering a cathode current collector on the cathode opposite the separator and an anode current collector on the anode opposite the separator;
layering a first cell wall on one of the cathode current collector and the anode current collector and a second cell wall on another of the cathode current collector and the anode current collector, the first cell wall and the second cell wall each having a surface area larger than each of the cathode current collector and the anode current collector, wherein the interlayer has an outer perimeter similar in size to an outer perimeter of each of the first cell wall and the second cell wall; and
sealing perimeters of the interlayer, the first cell wall and the second cell wall to form the electrochemical cell.

19. The method of claim 18, wherein the first cell wall and the second cell wall are a polymer laminated aluminum foil.

20. The method of claim 12, wherein the separator is a solid state electrolyte.

* * * * *